Sept. 25, 1951 D. C. ROCKOLA 2,569,115

FHONOGRAPH

Filed Sept. 8, 1944 5 Sheets-Sheet 1

Inventor
David C. Rockola
by Sheridan, Davis + Cargill
Attorneys

Sept. 25, 1951 | D. C. ROCKOLA | 2,569,115

PHONOGRAPH

Filed Sept. 8, 1944 | 5 Sheets-Sheet 2

Inventor
David C. Rockola
by Sheridan, Davis + Cargill
Attorneys.

Sept. 25, 1951 D. C. ROCKOLA 2,569,115

PHONOGRAPH

Filed Sept. 8, 1944 5 Sheets-Sheet 3

Inventor
David C. Rockola
by Sheridan, Davis & Cargill
Attorneys.

Sept. 25, 1951 D. C. ROCKOLA 2,569,115

PHONOGRAPH

Filed Sept. 8, 1944 5 Sheets-Sheet 4

Inventor
David C. Rockola
by Sheridan, Davis + Cargill
Attorneys.

Inventor
David C. Rockola
by Sheridan, Davis & Cargill
Attorneys.

Patented Sept. 25, 1951 2,569,115

UNITED STATES PATENT OFFICE 2,569,115

PHONOGRAPH

David C. Rockola, Chicago, Ill., assignor, by mesne assignments, to Rock-Ola Manufacturing Corporation, Chicago, Ill., a corporation of Delaware Application September 8, 1944, Serial No. 553,161

3 Claims. (Cl. 274—10)

This invention relates in general to phonographs and has more particular reference to a selector for multirecord phonographs which is operable in advance to predetermine for selection and play any one or more or each of any number of records in the multirecord phonograph.

An object of the invention is the provision in such a phonograph of a novel and improved selector.

An object of the invention is the provision of such a selector which, while operable to predetermine for selection and play one or more records preceding in order or arrangement the first record of any program or group previously predetermined for selection and play, will not select the later predetermined record or records until after the selection of all previously predetermined records.

A further object of the invention is the provision of such a selector having record predetermining or selector control means for preventing the selection of any later predetermined record or records preceding in order or including the first record of any program or group previously predetermined for selection and play until after the selection of the last record in the previously predetermined program or group.

Another object of the invention is the provision in such a selector of record selector control means for preventing the selection of any later predetermined record or records preceding in order or including any selected record of any plurality of records previously predetermined for selection and play until after the selection of the last record in the previously predetermined plurality of records.

Other objects of the invention include the provision of the novel elements and combinations as hereinafter disclosed and as illustrated in the accompanying drawings and such other objects will be apparent from the disclosure and accompanying drawings. In the drawings wherein the same reference characters apply to like parts throughout the several views.

The novel record selector illustrative of the present invention is shown in the accompanying drawings for convenience of illustration as being associated with and embodied in a multirecord automatic phonograph of the type disclosed in United States Letters Patent No. 2,159,834, issued May 23, 1939. Since such a phonograph is fully and completely disclosed in that patent and is well known in this art, a detailed disclosure thereof will not be repeated herein.

Figure 1:
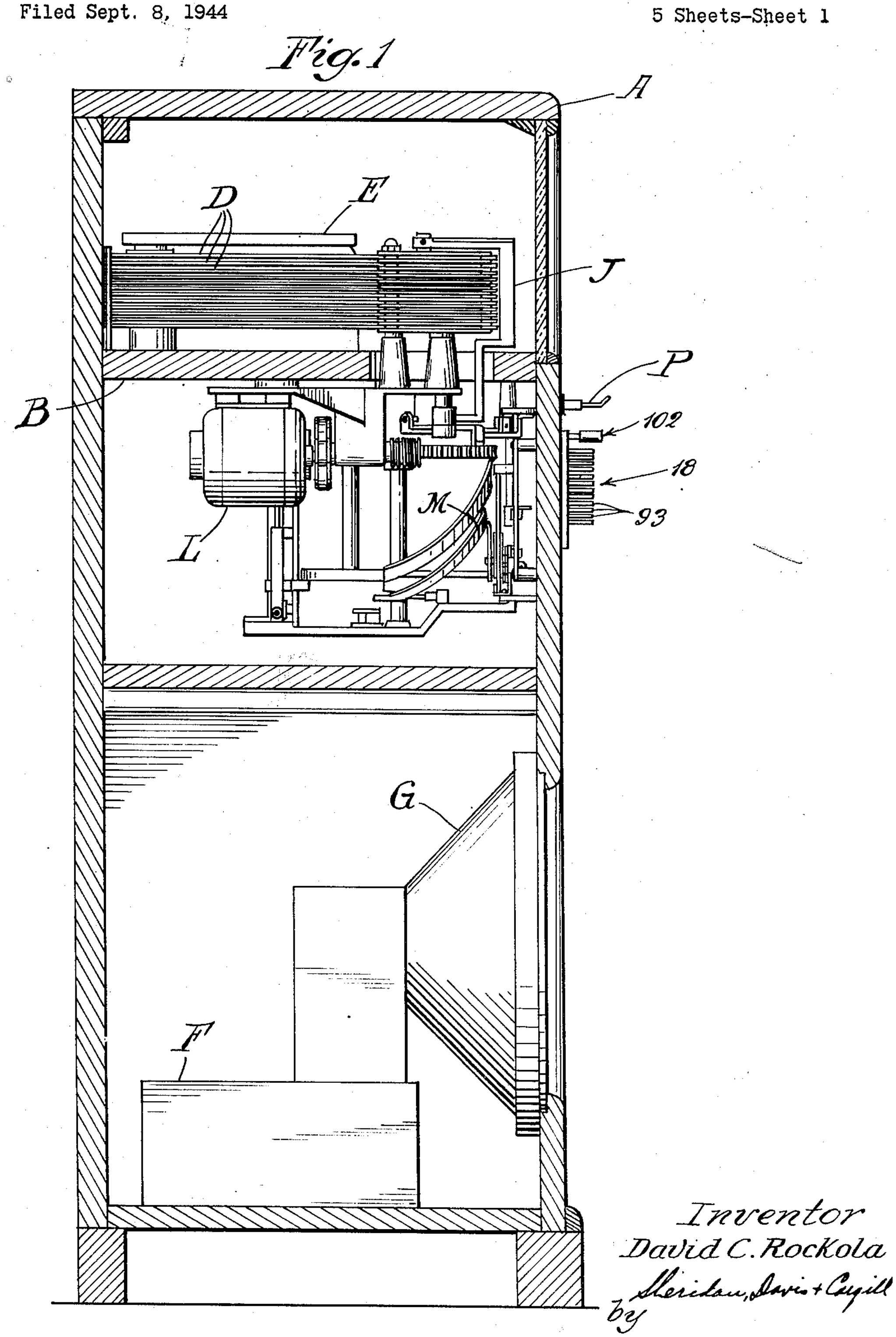
Figure 1 is a vertical cross section of a phonograph embodying some of the features of the invention.
Figures 2, 3:
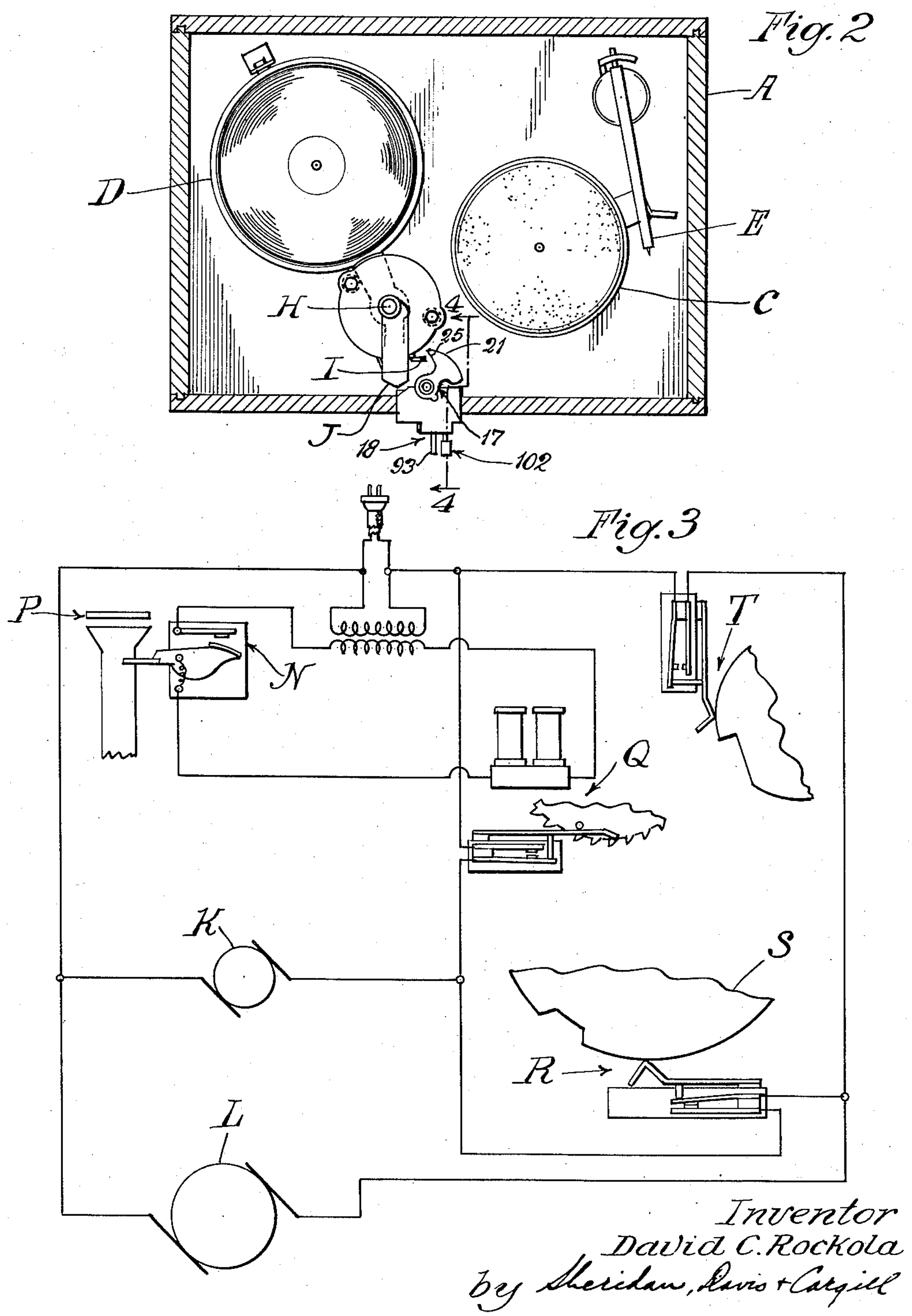
Fig. 2 is a horizontal cross section through the casing of the phonograph and shows a top plan view of the phonograph mechanism therein, as shown in Fig. 1.
Fig. 3 is a schematic wiring diagram of the phonograph control apparatus.

To facilitate understanding the present invention, it might be well, however, to point out that as shown in Figs. 1 to 3 such a phonograph comprises a suitable casing or cabinet A, a chassis or frame B secured therein, a reciprocable turntable C on the frame, a plurality of swingable ring-shaped record carriers D, a tone arm or reproducer E on the frame B, amplifier means F, and speaker means G. The record carriers D are mounted to swing about a common pivot H and are releasably latched one above another in stack or column relationship at one side of the turntable by a plurality of latch members I. There is one such latch member I for each record carrier. The latch members are selectively operable to release the respective record carriers and to latch or couple them to record carrier swinging means J for swinging the record carriers to and from the path of the reciprocable turntable C and thereafter to release the respective record carriers from the record carrier swinging means J and latch them in stack position.

Suitable driving means such as electrical motors K and L is arranged to rotate the turntable C and a multi-cam device M respectively. The multi-cam device M through suitable connections operates the record carrier swinging means J, reciprocates the turntable C, and returns the tone arm or reproducer E to its starting position after the playing of a record. The cam device M makes one complete revolution for each playing cycle of the phonograph and is adapted in so doing to swing one of the record carriers D into the path of the reciprocable turntable C, to move the turntable through such record carrier whereby to remove the record therefrom and to move that record into playing engagement with the reproducer E, and after playing of the record to return the reproducer to its starting position, to move the turntable through the record carrier in the path thereof whereby to return the played record thereto, and to return the turntable to its initial position and to return the record carrier bearing the played record to its stack position. It will be understood that the tone arm or reproducer and the turntable in playing a record cooperate to translate the irregularities recorded in the sound track of the record into mechanical variations and to convert those mechanical variations into electrical impulses. Those electrical impulses are supplied to the amplifier F and after amplification thereby are converted into sound by the speaker means G.

Referring more particularly to the schematic wiring diagram of Fig. 3, it will be seen that the illustrated phonograph includes a suitable control switch N to determine the number of records to be played, or, stated slightly differently, to determine the number of playing cycles through which the phonograph will be operated. If desired, as shown more or less diagrammatically in Figs. 1 and 3 the switch N is adapted for operation by a suitable coin controlled device P.

The switch N is operable one or more times depending upon the number of records or playing cycles desired. Each time the switch is closed it causes the actuation of a playing cycle accumulator Q in a playing cycle accumulating direction. The accumulator Q is actuated at the end of each playing cycle in the opposite or dispensing direction by means, not shown, rotatable with the cam device M, whereby the phonograph will operate through a number of playing cycles equal to the number of times the switch has been operated.

A control device R, including an operating member S rotating with the cam device M, interrupts the circuit of the motor L when the turntable bearing a record to be played arrives at playing position whereby to stop the rotation of the cam device M during the playing of the record. Upon completion of playing the record, a suitable trip mechanism T initiates the closing of, and the control device R maintains closed, the circuit of the motor L for driving the cam device M whereby to return the turntable, the record carrier, and hence the played record as well as the tone arm or reproducer to their initial positions.

To select a record in such a phonograph, it is only necessary to operate the latch member I corresponding to the record carrier bearing the desired record. Operation of that latch member I releases the corresponding record carrier for swinging movement and couples it to the record carrier swinging means J. In the above identified patent, means is disclosed for predetermining a plurality of records to be selected and played one at a time. Such means includes a selector member operated by the cam device M to operate one of the latch members I before the record carrier swinging means J begins to swing in a record delivery direction in each playing cycle.

Whenever more than one record are predetermined by that means the selector member during the first playing cycle operates the latch member I corresponding to the uppermost record carrier bearing a predetermined record. During the second playing cycle the selector member operates the latch member I corresponding to the next uppermost record carrier bearing a predetermined record and so on progressively downwardly until the lowermost predetermined record is selected and played, unless meanwhile a record or records above the uppermost previously predetermined record are predetermined for selection and play. In other words, selectors of the type disclosed in the above mentioned patent operate seriatum in a definite order, the latch members I respectively corresponding to the record carriers bearing the predetermined records unless the order is interrupted by a subsequent predetermining operation predetermining a record preceding in order the records remaining to be selected as a result of the previous predetermining operation.

Although selectors of that type have proved quite popular and for most purposes are satisfactory, they enable a person during the rendition of a program of records previously predetermined to substitute certain records subsequently predetermined by him for those earlier predetermined but remaining unselected and unplayed or to obtain the selection and playing of those certain subsequently predetermined records before the selection or playing of the earlier predetermined records remaining unselected and unplayed at the time of subsequent predetermination. For example, if one patron or user predetermines records #7, #9, and #11, and while, say record #7 is playing, but before the selection of record #9 or record #11, a second patron or user predetermines any record or records from #1 to #8 inclusive that record or those records will be selected and played before either record #9 or record #11 previously predetermined by the first patron but remaining unselected will be selected and played. If the phonograph is coin controlled in the cited example, having paid to hear records #9 and #11, the first patron, instead of hearing those two records will have substituted therefor the records predetermined by the second patron or at least two of them, although the second patron may not have paid to hear any records.

In order to avoid the difficulty and annoyance just pointed out, the selector of the present invention comprises a movable selector detent having a member adapted to cooperate with the predetermining means for positioning another member of the selector detent at any of a plurality of positions respectively corresponding to the record carriers. That other member of the selector detent is movable therewith and is adapted in any such position thereof to cooperate with a selector member for positioning the selecting mechanism at the position for operating the latch member I corresponding to the predetermined record. The selector detent is movable initially with the selecting mechanism to position it for operation of the latch member I corresponding to the first record to be played of the predetermined records or in the illustrated phonograph to the latch member corresponding to the uppermost predetermined record. At that position the selector detent is automatically separable from the selecting mechanism, and upon separation moves in only one direction until the last of the predetermined records is selected, the selector detent during such movement progressing independently of the movement of the selecting mechanism from each preceding position to the next succeeding position respectively corresponding to the predetermined records as each such preceding predetermined record is selected for playing. During the playing cycle of the last predetermined record or upon selection of the last, or in the illustrated phonograph lowermost, record, in the stack, the selector detent is returned by the selector elevating means to its initial position.

Thus, once the selector detent of this invention is moved to a position corresponding to a record carrier, it cannot be repositioned to stop the selecting mechanism at a position for selecting a predetermined record preceding it in order or higher in the stack until the last or lowermost predetermined record has been selected for playing, or until the selector detent has moved to the position corresponding to the last or lowermost record carrier. Since the selector detent moves in operation from one predetermined position to the next, upon selection of the record corresponding to the preceding position, it cannot be repositioned even at that preceding position until the last or lowermost predetermined record has been selected or until the selector detent has moved to its lowermost position. Hence while upper records may still be predetermined after one or more lower records have been selected and played and one or more predetermined records remain to be selected and played, the subsequently predetermined record or records above the uppermost of the previously predetermined record or records remaining to be selected cannot be selected until after the selection of the last record previously predetermined.

Figure 4:
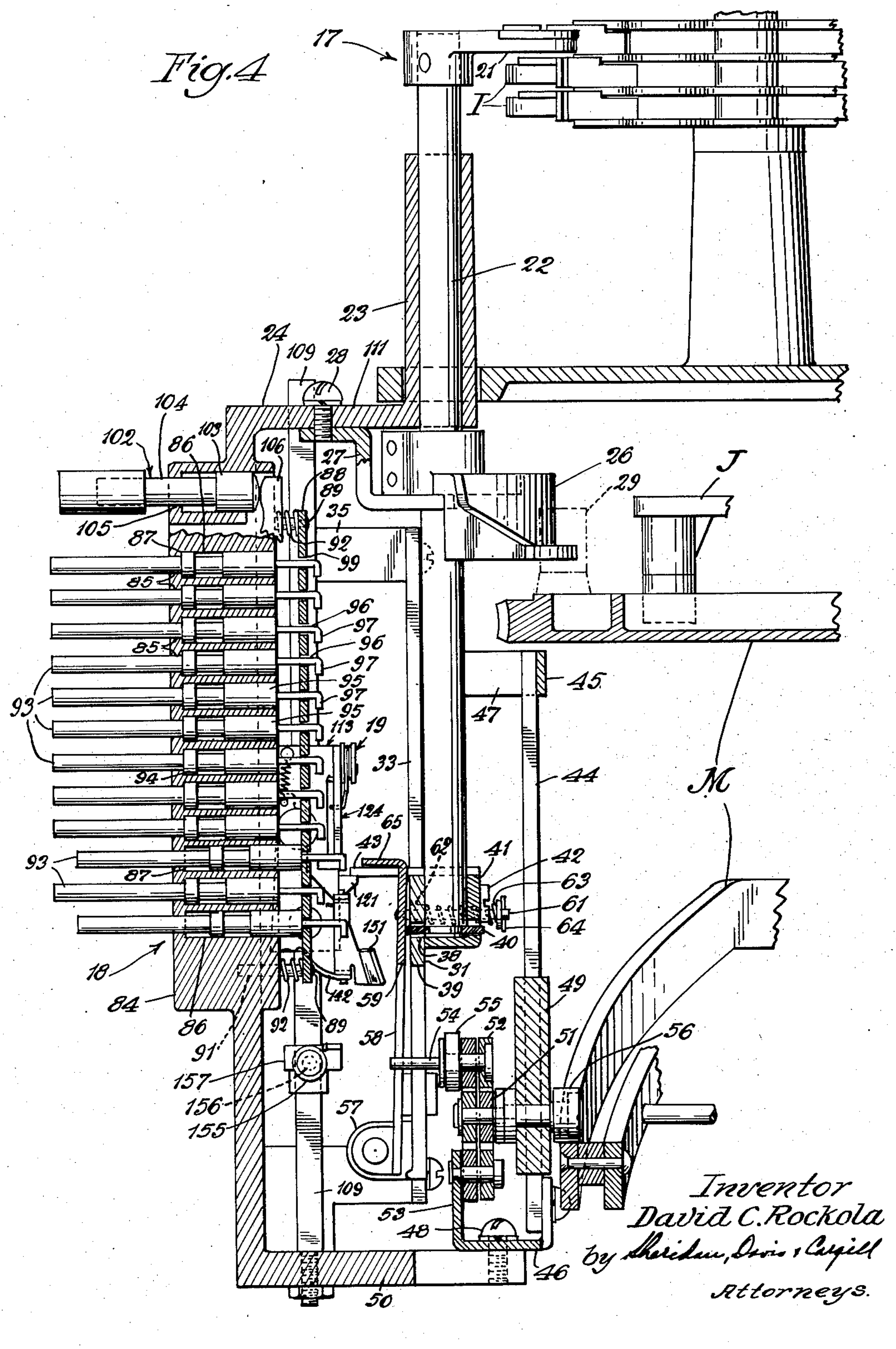
Fig. 4 is a fragmentary cross section taken substantially vertically through the selector control mechanism of the phonograph shown in Fig. 2 at about the lines 4—4 of that view of the drawing but drawn to a different scale.

Illustrative of the invention, the novel selector comprises as best shown in Figs. 1, 2, and 4 a suitable latch operating or selecting mechanism 17, a suitable selector control or record predetermining mechanism 18, and a movable selector detent 19 adapted to cooperate with the record predetermining means for predetermining the selecting operations of the selecting mechanism. The illustrated selecting mechanism 17 and the selector control or record predetermining mechanism 18 are like those disclosed in the above mentioned patent respectively but have been modified so that the selecting mechanism is not herein directly controlled by the record predetermining mechanism. Instead, as will be pointed out more fully presently, the selecting mechanism herein is controlled by the novel selector detent 19 which is at least in part controlled by the record predetermining mechanism and is operable by the elevating means of the selector mechanism.

For selectively operating the latch members I, the selecting mechanism 17 is provided with a latch operating or selecting member 21 fixed on and movable with a rockable and longitudinal reciprocable shaft 22 slidably journaled as at 23 in a selector control frame 24 suitably secured to the front of the frame B, as shown best in Figs. 1, 2, and 4. The selecting member is preferably of plate-like construction having a cam surface 25 which, upon rocking of the selector shaft 22, while the selecting member 21 is aligned with any one of the latch members I, will operate that latch member to effect the selection of the corresponding record carrier.

The selector shaft 22 extends through and is rotatable with a cam lever 26 secured against reciprocable axial movement with the shaft at a level slightly above the cam device M by a bracket 27 secured as at 28 to the selector control frame 24. As more fully described in the aforesaid patent, the cam lever 26 is adapted to be operated by means on the cam device M generally indicated in broken lines at 29 in Fig. 4 for rocking the shaft 22 and hence the selecting member 21 once during each playing cycle of the phonograph to effect the selection of records for playing as already described.

Figures 6, 7, 8, 9, 10:
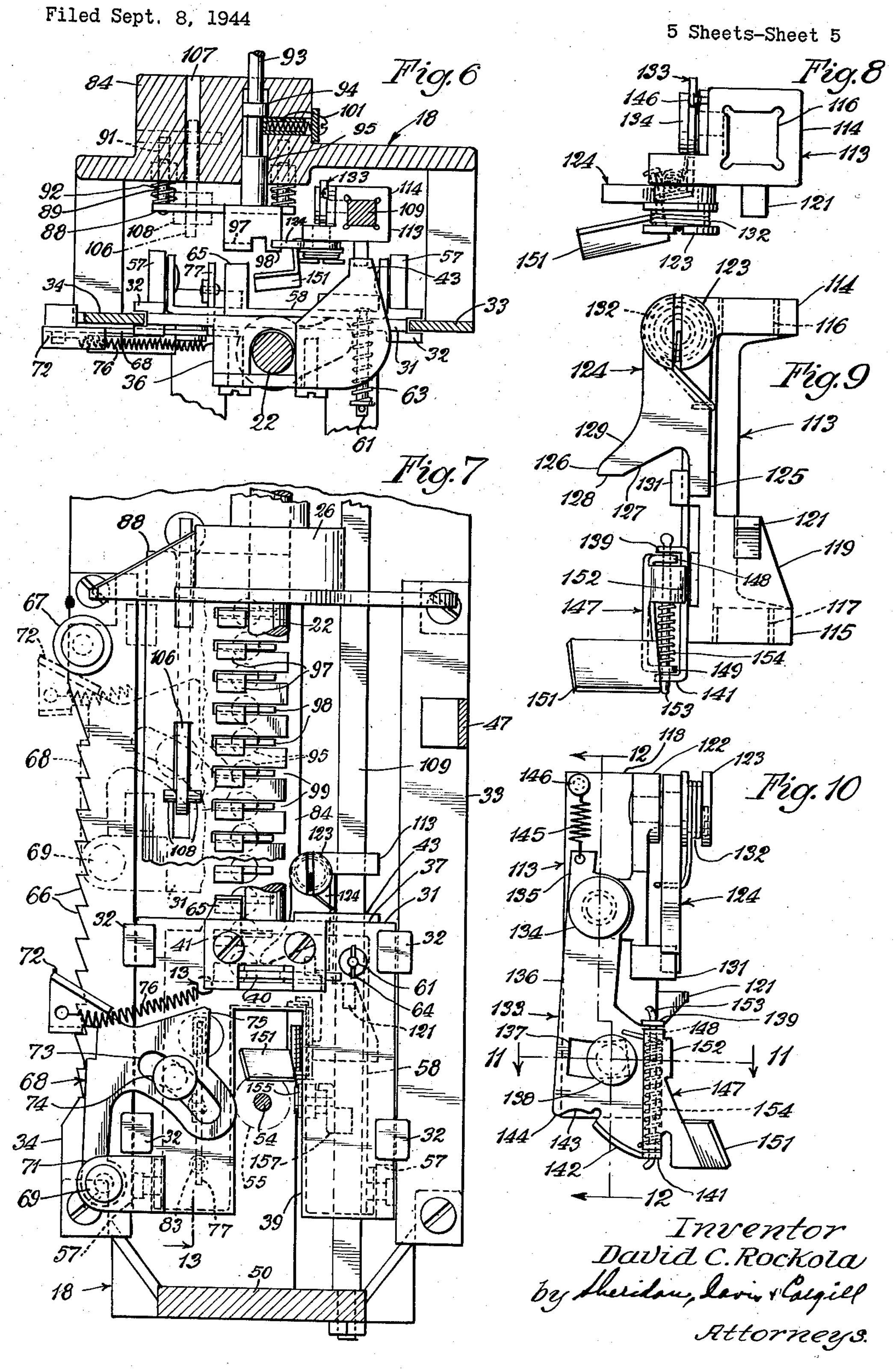
Fig. 6 is a cross section of the novel selector taken substantially along the lines 6—6 of Fig. 5.
Fig. 7 is a view like Fig. 5 with certain parts broken away or otherwise removed for clarity.
Fig. 8 is a plan view of a selector element or detent which is adjustable to a position corresponding to any predetermined record and thereafter if more than one record are predetermined successively to positions corresponding to succeeding predetermined records.
Fig. 9 is a rear elevational view of the selector detent shown in Fig. 8.
Fig. 10 is a side elevational view of the selector detent of Fig. 8.

As shown in Figs. 4 and 7, a reciprocable plate-like slide member 31 is provided as in the above mentioned patent with a plurality of bifurcated lugs 32 at its opposite side edges for slidably engaging the opposite faces of each of a pair of spaced guide rails 33 and 34 suitably secured to rearwardly extending lugs 35 of the selector control frame 24. The slide member 31 is formed or otherwise provided with a pair of spaced lugs 36 (Fig. 6) extending rearwardly from the rear face at the upper end of the slide member and with a web or connecting portion 37 in the angle between one of those lugs 36 and the rear face of the slide member. Below the lugs 36 the slide member is provided with a rectangular aperture 38 (Fig. 4) and therebelow with a slot 39 extending longitudinally of the slide member through the lower end thereof.

The lugs 36 are spaced apart sufficiently to receive therebetween the selector shaft 22, and they cooperate with an arm 40 fixed on the lower end of the shaft 22 and a retaining angle member 41 to facilitate rotatably securing the selector shaft to the slide member. In so securing the shaft 22 to the slide member 31, the lower end of the shaft is positioned between the spaced lugs 36 in such a manner that the arm 40 on the lower end of the shaft is positioned below the lugs 36 and extends into the aperture 38. The retaining angle member 41 is then arranged with one of its face portions rearwardly of the shaft 22 and bridging the space between the rear ends of the lugs 36 and with the other face portion extending forwardly from the lower margin of the first mentioned face portion and under the arm 40 on the lower end of the shaft 22. The retaining angle member is secured in that position by any suitable means 42. Thus secured together, the selector shaft 22 and the slide member will reciprocate as a unit.

Formed on the upper end of the retaining angle member 41 and extending forwardly therefrom over the connecting portion 37 is a finger or dog 43 (Figs. 4 and 6) which is reciprocable with the selector shaft 22. The finger 43 is adapted to cooperate with the selector detent 19 for stopping the selector member 21 in predetermined record selecting positions. The arm 40 is rockable with the selector shaft 22 and during the rotation of that shaft for operating the selector member 21 to effect the selection of a record, the outer or free end of the arm 40 swings through the aperture 38 to a position forwardly of the slide member 31.

A pair of vertical guide rails 44 are secured in parallel spaced relationship at their upper ends to a transverse strip 45 and at their lower ends to a bracket 46. They are mounted rearwardly of the guide rails 33 and 34 by a mounting bracket 47 secured to the guide rail 33 and to the transverse strip 45, and by the bracket 46 secured as at 48 to the lower end of the selector control frame 24. Arranged between the guide rails 44 is a slidable block or member 49 having guide ways in its opposite sides for sliding engagement with the guide rails. The slidable block 49 is connected at its forward face to an intermediate longitudinally central pivot 51 of a lazy tong linkage 52, the lower end of which is pivotally secured to an upstanding lug 53 of the bracket 46 between the forward guide rails 33 and 34 and the rearward guide rails 44, and the upper end of which is provided with a forwardly extending pivot pin 54 carrying forwardly of the linkage a roller or collar 55. At its rear face the slidable block 49 carries a cam roller or follower 56 adapted to cooperate with the cam device M for raising the slidable block to extend the linkage 52 and for lowering the slidable block to collapse the linkage 52.

When the slidable block 49 is thus raised, the forwardly extending pin 54 and the roller 55 at the upper end of the linkage 52 are elevated, the pin 54 moving upwardly in the slot 39 of the slide member 31 and the roller 55 moving upwardly along a path rearwardly adjacent the slide member. In so moving upwardly the roller 55 engages the face portion of the retaining angle member 41 under the lugs 36 and thereby elevates the slide member 31 and with it the selector shaft 22. When the slidable block 49 is lowered by the cam device M, the linkage 52 is collapsed, thus lowering the roller 55. Under certain conditions that causes the lowering of the slide member 31 and the shaft 22 under the control of the cam device M. The throw of the cam device M for thus reciprocating the selector shaft 22 in such that the selecting member 21 at the beginning of any playing cycle may be lowered from a position above the level of the uppermost latch member I to a position at the level of the lowermost latch member I and returned at the end of that playing cycle to its elevated initial position. The selecting member 21 is limited in its downward movement to a position for operating the lowermost latch member I by engagement of the lower end of the slide member 31 on a horizontally extending portion 50 of the selector control frame 24.

The slide member 31 is provided at its lower end with a pair of spaced lugs 57 extending forwardly from opposite sides of its forward face. Those lugs 57 have pivotally secured thereto a plate 58 extending upwardly adjacent the forward face of the slide member to its upper end and having a longitudinally open ended slot 59 like the slot 39 in the slide member. At its upper end the plate 58 has anchored therein a rearwardly extending pin or stud 61 extending through an aperture 62 in the upper end of the slide member 31. The pin 61 rearwardly of the slide member 31 passes through a coil spring 63 bearing at one end against the rear face of the slide member and at its opposite end against a suitable abutment 64 on the rear end of the pin 61. The spring 63 thus yieldably holds the upper end of the pivoted plate 58 against or adjacent the forward face of the slide member 31 where the pivoted plate is engageable by the arm 48 and is thereby swingable forwardly as the selector shaft 22 is rotated to effect selection. The spring 63 is adapted to return the plate to its initial position when the selector shaft is rotated in the opposite direction after selection is effected.

In swinging forwardly the pivoted plate 58 carries with it a forwardly extending lug 65 integral therewith and at the upper end thereof for returning the particular record predetermining element which caused the selecting mechanism to stop in a selecting position. The forward swinging of the pivoted plate 58 also actuates means for supporting the selector shaft and selecting member at any selecting elevation after the return of the record predetermining element which caused the selecting mechanism to stop in a selecting position. For that purpose the guide rail 34 is formed with a rack 66 along its edge opposite that slidably engaged by the slide member 31 and is provided at its upper end with a cam roller 67 secured to the rear face of the guide rail above the rack teeth.

Figures 5, 11, 12, 13:
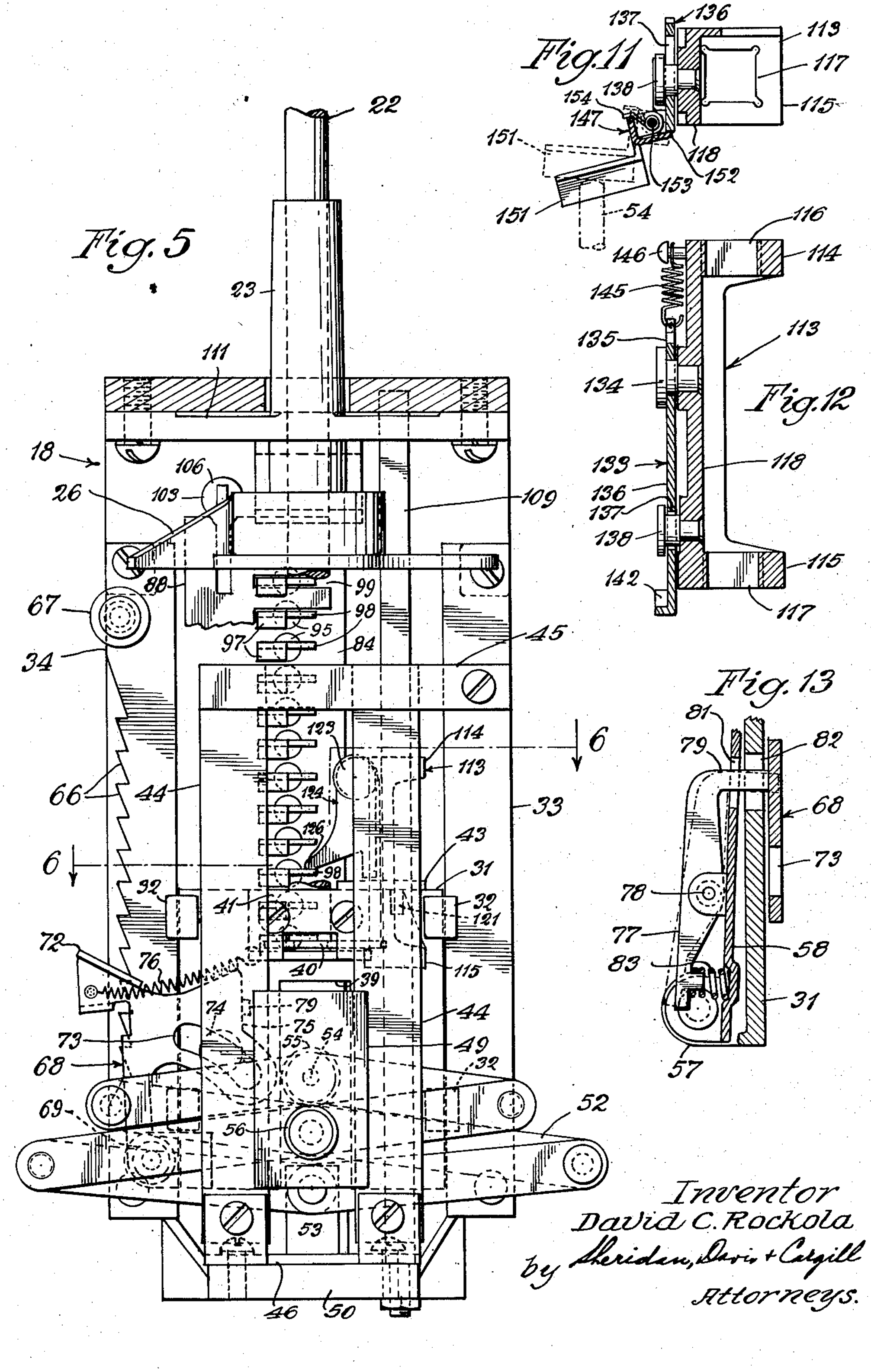
Fig. 5 is a fragmentary rear elevation of the novel selector.
Fig. 11 is a cross section taken substantially along the lines 11—11 of Fig. 10 and shows the two positions of its pawl arm relative to the elevating means of the selecting mechanism.
Fig. 12 is a cross section taken substantially along the lines 12—12 of Fig. 10.
Fig. 13 is a fragmentary cross section taken substantially along the lines 13—13 of Fig. 7.

Cooperating with the rack 66 is a rockable pawl 68 which is pivotally mounted as at 69 on a lug 71 at the lower end of the slide member 31, the lug 71 extending laterally therefrom to a position rearwardly of the guide rail 34. The pawl 68 is stamped or otherwise provided with a pawl operating cam arm 72, an arcuate aperture 73 through which extends a headed pin or stud 74 anchored in the rear face of the slide member 31, and an upstanding shoulder or abutment portion 75. A suitable spring 76 secured at one end to the pawl 68 and at its other end to the retaining angle member 41 yieldably urges the pawl toward engagement with the rack 66. The shoulder portion 75 of the pawl 68 cooperates with a spring urged lever 77 (Fig. 13) releasably to hold the pawl out of engagement with the rack 66 when, during elevation of the selector shaft assembly, the cam arm 72 engages the cam roller 67 and swings the pawl 68 to its disengaged position, and until the descent of the selecting mechanism to a selecting position.

That spring urged lever 77 is pivoted at 78 on the forward face of the pivoted plate 58 in such a position that a finger 79 of the lever 77 extends rearwardly through an aperture 81 in the plate 58 and an aligned aperture 82 in the slide member 31 and into abutting relationship with the shoulder portion 75 of the pawl 68 when the pawl is disengaged from the rack 66. During the elevation of the slide member 31, the selector shaft 22, and the selecting member 21, the pawl 68 slides over the teeth of the rack 66. At the upper position of the slide member 31, the cam arm 72 of the pawl 68 engages the cam roller 67 and is cammed in a counter-clockwise direction (Fig. 7), about its pivot sufficiently to clear the end of the finger 79 of the lever 77, whereupon a suitable spring 83 urges the lever to a position at which the finger 79 engages the shoulder portion 75 of the pawl and holds it out of engagement with the rack.

During the lowering of the slide member 31, the selector shaft 22, and the selecting member 21, the pawl 68 does not therefore engage the rack 66. When, however, the pivoted plate 58 is swung forwardly as already described, the spring urged lever 77 moves forwardly with the plate, disengaging the pawl 68, whereupon the spring 76 swings the pawl into supporting engagement with the rack 66. Thus the slide member 31, the selector shaft 22, and the selecting member 21 are releasably latched in their selecting positions.

Suitable record predetermining means for predetermining one or more records to be selected is shown in Figs. 1, 2, and 4 to 7. As therein illustrated the record predetermining means is carried by the selector control frame 24, which for that purpose is provided with a front frame member 84 having a plurality of apertures or passages 85 therethrough. There is one such passage for each record carrier D and each such passage 85 is enlarged as at 86 rearwardly of the front face of the frame member 84 to provide an internal flange or shoulder 87. Rearwardly of its rear face, the front frame member 84 has a rectangular plate 88 movably secured thereto for limited movement by pins 89 projecting forwardly from the plate at its corners and slidably receivable in sockets 91 in the frame member 84. A coil spring 92 is placed on each pin 89 between the plate 88 and the frame member 84 for yieldably holding the plate in rearward spaced relationship to the frame member.

As shown in Fig. 4, the record predetermining means as in the above mentioned patent comprises a plurality of reciprocable rods 93, one for each record carrier D. Each rod 93 is provided with two spaced flange or enlarged portions 94 and 95 intermediate its ends and with an end projection 96 having a portion of its end formed to provide a depending abutment portion 97 and an adjacent detent portion 98. With the end projection 96 of each rod 93 between the flange portion 95 and the abutment portion 97 slidably arranged in a slot 99 in the plate 88, there being one such slot 99 for each rod 93 and the slots 99 being registerable with the respective passages 85 when the pins 89 are aligned with the sockets 91 in the frame member 84, the opposite ends of the rods 93 are inserted in the rear ends of the respective passages 85. The thus related plate 88 and rods 93 are then moved forwardly to move the pins 89 into the sockets 91 and to move the forward ends of the rods 93 through the front selector control member 84. The passages 85, plate 88, and rods 93 are so constructed and arranged that when assembled as just described, the detent portions 98 are spaced from and are vertically aligned with one another, the vertical spacing between succeeding detent portions being equal to that between the respectively corresponding latch members I. Likewise, when so arranged, the depending abutment portions 97 are in vertical alignment with one another and are spaced laterally from the respective detent portions 98. A spring urged pin 101 extends into each enlarged portion 86 of each passage 85 between the flange portions 94 and 95 for limiting the reciprocable movement of the rods 93.

The rods 93 are individually movable to selecting position by manually pushing them inwardly of the frame member 84 or rearwardly until the respective flange portions 94 engage the pins 101. If desired, a plurality of the rods are movable simultaneously to the selecting position. As in the above mentioned patent, suitable means is provided for manually restoring the rods 93 to their outer position. Such means being substantially identical to that shown in the aforesaid patent is illustrated more or less diagrammatically as comprising a cancellation rod 102 having a flange portion 103 reciprocable in the frame member 84 and having a shank portion 104 extending forwardly through an aperture 105 outside and forwardly of the frame member 84, where the shank portion is, if desired, equipped with an operating push button handle. As in the above mentioned patent, the flange portion 103 is engageable with one end of a lever 106 which is pivoted intermediate its ends in a rectangular aperture 107 in and longitudinally of the frame member 84 and which has another end having a suitable connection 108 with the plate 88. When the cancellation rod 102 is pushed inwardly, it pivots the lever 106 causing the lever through the connection 108 to move the plate 88 forwardly against the action of the springs 92 whereby the plate 88 will engage the flange portion 95 of each rod 93 in the selecting position and return it or them to the outer or non-selecting position. Upon release of the cancellation rod 102, the springs 92 return the plate 88 to its initial position, causing the plate through the connection 108 to restore the lever 106 and the cancellation rod 102 to their initial positions.

Unlike the structure disclosed in the above mentioned patent, the selector finger or dog 43 is not engageable with the detent portion 98 of any rod 93. Instead the selector finger or dog 43 in the present invention moves up and down along a path at one side (Fig. 6) of the vertically aligned detent portions 98 and cooperates with the novel selector detent 19 for stopping the selecting member 21 in the record selecting positions predetermined by operation of the rods 93. The embodiment of the novel selector detent 19 presently preferred is shown in Figs. 4 to 12 and is slidably mounted on a substantially square or other suitably shaped rod 109 which is anchored at its lower end in the rearwardly and horizontally extending portion 50 and at its upper end in a rearwardly and horizontally extending portion 111 of the selector control frame 24 forwardly of the selector finger 43 and at the side of the detent portions 98 opposite the abutment portions 97 of the rods 93.

That novel selector detent, as shown in Figs. 8 to 12, comprises a body or frame 113 cast or otherwise made with spaced parallel top and bottom members 114 and 115 having aligned apertures 116 and 117. The apertures 116 and 117 conform generally to the configuration of the rod 109 to prevent rotation of the selector detent relative to the rod 109 when the detent is arranged thereon with the rod extending through the apertures 116 and 117. A side face portion 118 of the body 113 is integral with and extends between the top and bottom members 114 and 115 and a partial rear face portion 119 integral with the bottom member 115 and the side face portion 118 is provided intermediate the top and bottom members with a rearwardly extending detent lug 121.

Extending laterally from the upper end of the side face portion 118 at the rear side thereof is a lug 122 in which is anchored a pivot bolt or pin 123 for a pivoted pawl 124. That pawl 124 is stamped or otherwise formed generally in the shape of a boot and with a depending lug 125 resembling a heel and an integral lug 126 extending laterally from the lug 125 and providing a lower edge surface 127 resembling the lower arch of a boot between the lug 125 and a horizontal lower edge surface 128 and providing an upper cam surface 129 resembling the instep portion of a boot.

The pawl 124 is pivoted on the bolt 123 and depends therefrom. It is of such a size that the lugs 125 and 126, when the pawl is so mounted, are in engageable relationship with opposite sides of an angular limit lug 131 projecting laterally from the side face portion 118 and then rearwardly at a level above the detent lug 121. A suitable spring 132 coiled about the shank of the pivot bolt 123 has one end secured to the bolt and its other end depending therefrom and looping about the boot-shaped pawl between its upper and lower ends. The spring 132 yieldably holds the pawl 124 in such a position that the lug 125 engages the limit lug 131 at one side thereof and the lower edge surface 128 of the lug 126 is spaced from the opposite side of the limit lug 131.

The body 113 of the novel selector detent 19 carries a lever 133 pivotally mounted on a pin 134 anchored in the side face portion 118 below and forwardly of the laterally extending lug 122. That lever 133 is stamped or otherwise formed with an upwardly extending arm 135 and a depending arm 136. The depending arm has a rearwardly extending portion below the angular limit lug 131 of the body 113 and is provided with an arcuate aperture 137 cooperating with a pin 138 anchored in the side face portion 118 to permit limited pivotal movement of the lever 133 about its pivot pin 134. At the rear end of the rearwardly extending portion of the depending lever arm 136 are laterally extending upper and lower pawl mounting lugs 139 and 141. The depending lever arm 136 extends beyond the lower end of the body 113 and therebelow is formed with a cam ledge 142 and forwardly adjacent thereto with an arcuate slot 143 having a depending forward end 144 (Fig. 10). A suitable spring 145 having one end fixed to a pin or projection 146 at the upper end of the body 113 and its opposite end fixed to the upwardly extending lever arm 135 yieldably holds the lever 133 in the position shown in Fig. 10 wherein the rear end of the aperture 137 is in engagement with the pin 138.

Carried at the lower end of the lever 133 is a pawl 147 stamped or otherwise formed with parallel forwardly extending end lugs 148 and 149, a laterally extending downwardly and rearwardly inclined pawl arm 151, and above the pawl arm 151 an oppositely extending lug or tab 152. The lugs 148 and 149 of the pawl 147 are arranged between and respectively adjacent the pawl mounting lugs 139 and 141 of the lever 133 and a pivot pin 153 is inserted through apertures in the adjacent lugs 139 and 148, a suitable coil spring 154 and apertures in the adjacent lugs 141 and 149. One end of the coil spring 154 bears against the depending lever arm 136, and the other end of that spring bears against the forward side of the pawl 147 for yieldably holding the pawl in such a position that the lug 152 engages the rear side of the depending lever arm 136 to limit rotational movement of the pawl in a counter-clockwise direction as viewed in Fig. 6 about its pivot pin 153.

As already mentioned, the novel selector detent 19 is interposed between the selector finger 43 and the rods 93 for cooperation therewith in predetermining one or more records for selection and playing. When so mounted, the detent lug 121 is below and vertically aligned with the selector dog or finger 43 of the selecting mechanism 17. The laterally extending lug 126 of the boot shaped pawl 124 is engageable with the detent portion 98 of any rod 93 in selecting position and the pawl arm 151 is movable about its pivot pin 153 to and from the path of the pin 54 at the upper end of the lazy-tong linkage 52. In such position the selector detent is slidable up and down along the rod 109 between an uppermost position wherein the horizontal lower edge 128 of the boot shaped pawl 124 is above the uppermost rod 93 corresponding to the record in the uppermost record carrier D and the lowermost position wherein that horizontal lower edge 128 is below the level of the lowermost rod 93 corresponding to the record in the lowermost record carrier D.

When the selector detent moves upwardly the upper cam surface 129 of the boot shaped pawl 124 will engage the detent portion 98 of any rod 93 in selecting position. The pawl 124 will thereby be cammed about its pivot bolt 123 against the action of its spring 132 to permit continued upward movement of the selector detent. As the selector detent moves to its lowermost position, the cam ledge 142 at the lower end of the lever 133 engages a roller 155 on a pin 156 passing through a selector detent supporting and limiting bracket 157 and into the square rod 109. The roller 155, pin 156, and bracket 157 are shown best in Fig. 4. As the selector detent 19 continues its downward movement, the cam ledge 142 and roller 155 cam the lever 133 about its pivot pin 134 against the action of the spring 145 and thus move the downwardly and rearwardly inclined pawl arm 151 rearwardly toward the path of the forwardly extending pivot pin 54 at the upper end of the lazy-tong linkage 52. The downward movement of the selector detent is limited by the bracket 157, and when the lower end of the body 113 of the selector detent moves into supporting engagement on that bracket the roller 155 is engaged in the arcuate slot 143 between the forward end of the cam ledge 142 and the depending forward end 144 of the slot 143 whereby to hold the lever 133 in such a position that the pawl arm 151 is in the path of the forwardly extending pin 54 of the lazy-tong linkage 52.

In operation initially the record carriers D are in stack or column relationship at one side of the turntable C, and the cam device M by engagement with the roller 56 is holding the lazy-tong linkage 52 in its extended position. In that position, the roller 55 by engagement under the retaining angle member 41 supports the selecting mechanism in its elevated or uppermost position and the pin 54 extends forwardly from the upper end of the lazy-tong linkage through the aligned slots 39 and 59 in the slide member 31 and the pivoted plate 58 respectively. In the elevated or uppermost position of the selecting mechanism the selecting member 21 at the upper end of the selector shaft 22 is above the level of the uppermost latch member I. Let it be assumed now that the selector detent is in its uppermost position, where it will be supported by engagement of the pawl arm 151 on the pin 54. The selector detent will initially be in that uppermost position if the last record predetermined was the record in the lowermost record carrier D and that predetermined record was the last record selected or played in the next preceding use of the phonograph, or if during the last playing cycle in the next preceding use of the phonograph the selector detent descended to its lowermost position upon selection of the record to be played in that playing cycle, in which event after the playing of the selected record the selector detent 19 will be elevated to its uppermost position by the pin 54 before the control devices R and Q stop the operation of the phonograph.

Engagement of the pawl arm 151 on the pin 54 holds the pivoted lever 133 against the action of its spring 145 in its rearward position. If, while the selector detent and the selecting mechanism are in the positions just described, one or more of the rods 93 are pushed inwardly of the frame member 84 to selecting position and the phonograph is started by closing the control switch N once for each record desired, the ensuing rotation of the cam device M causes the lowering by gravity of the selecting mechanism 17 and the selector detent 19 supported thereby. The descent of the selector detent is interrupted by engagement of the horizontal lower edge 128 of the boot-shaped pawl 124 on the detent portion 98 of the rod 93 which is in selecting position or, if more than one such rod 93 are in selecting position, on the detent portion 98 of the uppermost rod in selecting position. The selecting mechanism 17 thereafter continues its downward movement until the selector dog or finger 43 engages on the detent lug 121 of the positioned selector detent.

The engagement of the selector dog or finger 43 on the detent lug 121 interrupts the descent of the selecting mechanism. The cam device M, however, continues to rotate, and thereafter causes the lowering of the slidable block 49 to collapse the lazy-tong linkage 52 as shown in Fig. 4. During such lowering of the block 49 to collapse the lazy-tong linkage 52, the pin 54 moves downwardly in the aligned slots 39 and 59 of the slide member 31 and pivoted plate 58, respectively, out of engagement with the pawl arm 151, whereupon the spring 145 returns the pivoted lever 133 to its forward position and with the lever moves the pawl arm 151 out of the path of the pin 54.

When the detent lug 121 is engaged by the descending selector dog or finger 43 and stops the selecting mechanism 17, the selecting member 21 at the upper end of the selector shaft 22 is at the elevation of the latch member I controlling the record carrier D bearing the record corresponding to the rod 93 which stopped the descent of the selector detent 19. In that position, as already described, selection of the record is effected by rocking the selector shaft 22 about its longitudinal axis to cause the operation of the latch member I by the selecting member 21. During the rocking movement of the selector shaft 22 as just mentioned, the arm 40 at the lower end thereof cams the pivoted plate 58 forwardly against the action of its spring 63, which returns the plate to the position shown in Fig. 4 after operation of the latch member I by the selecting member 21. In moving forwardly, the plate 58 moves the finger 79 of the spring urged lever 77 out of engagement with the shoulder portion 75 of the pawl 68. The spring 76 thereupon swings the pawl 68 into engagement with the rack 66 for supporting the selecting mechanism in that elevated position. Also in moving forwardly, the plate 58 moves its forwardly extending lug 65 into engagement with the depending abutment portion 97 of the record 93 which stopped the descent of the selector detent 19 and which now supports it.

The forward movement of the lug 65 is sufficient to return the rod 93 to its initial or non-selecting position. When the rod 93 is thus returned to its non-selecting position, the detent portion 98 thereof moves out of supporting engagement with the horizontal lower edge 128 of the boot shaped pawl 124, thus freeing the selector detent of its support. The selector detent thereupon is moved downwardly, in the illustrated phonograph, by gravity, until its descent is again interrupted by engagement of the lower horizontal edge 128 of the boot shaped pawl 124 on the detent portion 98 of the next lower rod 93 in the selecting position, or, if none lower is in selecting position, until it reaches its lowermost position. As already explained, if the selector detent moves to its lowermost position, the cam ledge 142 on the lever 133 will cooperate with the roller 155 to return the pawl arm 151 into the path of the pin 54, which has already descended to its lowermost position below such position of the pawl arm 151. Meanwhile the cam device M continues to rotate and such continued rotation of the cam device M, it will be remembered, moves the selected record carrier D bearing the predetermined record to a position in the path of the reciprocable turntable C and elevates the turntable which in moving upwardly passes through the selected record carrier, removing therefrom the predetermined record, and moves it into playing relationship with the reproducer E, whereupon the control device R interrupts the circuit of motor L to stop the rotation of the cam device M while the record is being played.

Upon completion of the playing of the predetermined record, the trip mechanism T initiates and the control device R continues the operation of the motor L, whereby rotation of the cam device M is resumed. The resumed rotation of the cam device M causes the lowering of the turntable bearing the played record through the record carrier D from which it was previously removed, whereby to replace the played record in the record carrier. The cam device M continues its resumed rotation and thereafter causes the return of the turntable to its lowermost position and of the record carrier bearing the played record to its position in stack and the extending of the lazy-tong linkage 52. In so extending the lazy-tong linkage 52 the roller 55 at the upper end thereof moves upwardly into engagement under the retaining angle member 41 and thereafter returns the selecting mechanism 17 to its uppermost position.

In moving upwardly during the extending of the lazy-tong linkage 52, the pin 54 will return the selector detent 19 to its uppermost position if the played record had been the only one predetermined and in consequence thereof the selector detent had upon selection of the record as above described descended to its lowermost position. If, however, more than one rod 93 had been moved to a selecting position to predetermine more than one record, then during such upward movement of the selecting mechanism the selector detent 19 is at an intermediate position determined by the next lower rod 93 in selecting position and is supported in that intermediate position by engagement of the lower horizontal edge 128 of the boot shaped pawl 124 on the detent portion 98 of such next lower rod 93 in selecting position. When the selector detent is in such intermediate position the spring 145 holds the lever 133 in its forward position where the pawl arm 151 is out of the path of the pin 54. When therefore the pin 54 is moved upwardly during the restoration of the selecting mechanism to its uppermost position while the selector detent 19 is in an intermediate position, the end of the pin moves along a path rearwardly of the pawl arm 151 and therefore does not engage the pawl arm to move the selector detent out of its position for predetermining the record corresponding to the rod 93 supporting the selector detent in such intermediate position.

Thus the first cycle is completed and if only one record was predetermined, then when the selector detent and selecting mechanism reach their uppermost positions as described above, the control device Q stops the phonograph. If, however, more than one record had been predetermined and the selector detent is in the intermediate position as just described, the control device Q causes the phonograph to repeat the foregoing playing cycle relative to the record corresponding to the second or next lower rod 93 moved to the selecting position, and such playing cycle is repeated for as many times as the switch N was closed.

If, while the selector detent 19 is in any such intermediate position, the rod 93 supporting it, and all lower rods 93 in selecting position, are restored to nonselecting position, by, for example, operation of the cancellation rod 102, the selector detent will be released and will descend to its lowermost position perhaps while the pin 54 is in its elevated position. If the phonograph is then started by operation of the switch N without the movement of any rod 93 to its selecting position, the selecting mechanism will through the lazy-tong linkage and the cam device M be lowered to its lowermost position, at which the record in the lowermost record carrier will be selected for play, as already described. In moving to its lowermost position after the selector detent 19 is in the lowermost position, the pin 54 will engage the pawl arm 151 and will cam the pawl 147 about its pivot pin 153 to permit the pin 54 to be moved to a position below the pawl arm. As the pin moves to that position, the spring 154 returns the pawl 147 to its position where the pawl arm 151 is in the path of and above the pin 54. Thus upon completion of playing of the lowermost record so selected, the selecting mechanism and selector detent will be returned to their elevated positions as already described above.

If, while the selector detent 19 either is at any position other than its uppermost position or is at the position corresponding to the uppermost record, one or more rods 93 corresponding to a record carrier or record carriers above that corresponding to the position of the selector detent are moved to selecting position, the corresponding records are predetermined, but since the selector detent 19, once it has started to descend cannot thereafter be elevated until it has moved to its lowermost position, such upper rods 93 while predetermining the corresponding records will not be effective until all of the records previously predetermined have been selected. When that occurs the selector detent as already described descends to its lowermost position and is then elevated, upon completion of the playing of the last selected record, to its uppermost position. During the next succeeding cycle, the selector detent descends to supporting engagement on the uppermost rod 93 subsequently moved to selecting position. In moving upwardly under such condition the upper cam surface 129 of the boot shaped pawl 124 engages the detent portion or detent portions 98 of the upper operated rods 93, causing the pawl to be cammed about its pivot bolt 123 against the action of its spring 132 to permit the selector detent to escape upwardly beyond the uppermost of any such rod 93 in selecting position. As it moves above such uppermost rod in selecting position, the spring 132 restores the pawl 124 to the position shown in Fig. 9.

It will be seen that with the novel selector as described herein the selector detent 19 cooperates with the rods 93 to position the selecting mechanism 17 seriatum for selecting in a definite order records predetermined for selection and play, and to prevent selecting the next preceding record or any record preceding or higher in the stack than the next preceding record until the last or lowermost predetermined record has been selected for playing.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described being merely a preferred embodiment of the invention.

I claim:

1. A record selector for a multi-record phonograph, comprising a record selecting mechanism mounted for movement from and to an initial position and having a course of movement including a plurality of record selecting positions; operating means for moving said record selecting mechanism between said initial position and every one of said record selecting positions; record predetermining means operable at a plurality of positions respectively corresponding to said record selecting positions for predetermining a number of record selecting positions to which said selector mechanism is to be moved; and a movable selector detent having a course of movement corresponding to that of said record selecting mechanism including means engageable with said record predetermining means at all of said positions respectively corresponding to said record selecting positions for sequentially interrupting movement of said selector detent in a direction away from said initial position at a number of record predetermining positions, means engageable by said selecting mechanism for stopping it at a record selecting position for each record predetermining position of said selector detent, and means normally in an ineffective position during movement of said selector detent from one to another of said record predetermining positions in a direction away from said initial position and automatically movable to an effective position after movement from a predetermined one of said record predetermining positions in a direction away from said initial position for engagement and movement by said operating means to said initial position.

2. A record selector for a multi-record phonograph, comprising a selector mechanism successively movable between an initial position and a number of selecting positions spaced different distances from said initial position, a selector detent engageable by said selector mechanism at said initial position and each of said selecting positions, separable from said selector mechanism at each of said selecting positions, and movable a definite distance away from said initial position before it is returnable thereto, means sequentially engageable by said selector detent to interrupt its movement away from said initial position at a number of said selecting positions within said definite distance for positioning it at predetermined selecting positions, means for separating said selector detent and said selector mechanism at each predetermined selecting position to enable said selector detent to resume its interrupted movement away from said initial position, and means for returning said selector detent to said initial position when it has moved said definite distance therefrom.

3. A record selector for a multi-record phonograph, comprising a selector mechanism successively movable between an initial position, a number of intermediate selecting positions spaced at different distances from said initial position, and a terminal position, a movable selector detent disposed for engagement with said selector mechanism and movable along a similar course but disengageable therefrom at each of said selecting positions, operating means for moving said selector mechanism from any one of said selecting positions to a position a definite distance away from said initial position and then returning it to said initial position, predetermining elements disposed at a number of selecting positions within said definite distance, each actuatable to a set position, and disposed when in said set positions for engagement with said selector detent, means acting between said selector detent and said elements for interrupting movement of the detent upon engagement with any of said elements in set position as said detent moves away from said initial position, and means for moving each of said elements out of engagement with said detent to permit continued movement of the latter away from said initial position, said operating means being effective to separate said selector mechanism from said selector detent at each predetermined selecting position to enable said selector detent to resume its interrupted movement away from said initial position and means responsive to movement of said selector detent to said terminal position for effecting its return to initial position.

DAVID C. ROCKOLA.

REFERENCES CITED

The following references are of record in the file of this patent:

UNITED STATES PATENTS

| Number | Name | Date |
|---|---|---|
| 2,047,749 | Small | July 14, 1936 |
| 2,159,834 | Smyth | May 23, 1939 |
| 2,215,141 | Wilcox | Sept. 17, 1940 |
| 2,249,216 | Lessman | July 15, 1941 |